US012803883B2

(12) United States Patent
Ackerman et al.

(10) Patent No.: US 12,803,883 B2
(45) Date of Patent: Nov. 17, 2026

(54) VARIATIONAL OUTCOME-MAPPING MODEL FOR NETWORK ROUTING

(71) Applicant: Stripe, LLC, South San Francisco, CA (US)

(72) Inventors: Joshua Ackerman, San Francisco, CA (US); Michael Cribbin, Greystones (IE); Andrei Zaharia, Bellevue, WA (US); Niall O'Hara, Castlebar (IE); Aidan Foley, Dublin (IE); Cody Ley-Han, Seattle, WA (US)

(73) Assignee: Stripe, LLC, South San Francisco, CA (US)

( * ) Notice: Subject to any disclaimer, the term of this patent is extended or adjusted under 35 U.S.C. 154(b) by 173 days.

(21) Appl. No.: 18/979,430

(22) Filed: Dec. 12, 2024

(65) Prior Publication Data

US 2026/0172318 A1 Jun. 18, 2026

(51) Int. Cl.

| | |
|---|---|
| ***H04L 41/16*** | (2022.01) |
| ***H04L 45/028*** | (2022.01) |
| ***H04W 24/02*** | (2009.01) |

(52) U.S. Cl.

CPC ............ *H04L 41/16* (2013.01); *H04L 45/028* (2013.01); *H04W 24/02* (2013.01)

(58) Field of Classification Search

None

See application file for complete search history.

(56) References Cited

U.S. PATENT DOCUMENTS

| | | | | |
|---|---|---|---|---|
| 11,153,196 | B2 * | 10/2021 | Sanchez Charles .. | H04L 41/122 |
| 12,166,644 | B2 * | 12/2024 | Toy ........................ | G06N 20/00 |
| 2022/0245441 | A1 * | 8/2022 | Dechene ................ | G06N 3/006 |
| 2022/0353172 | A1 * | 11/2022 | Ghosh ..................... | H04L 47/25 |

OTHER PUBLICATIONS

Iqbal et al., "A Bird's Eye View on Requirements Engineering and Machine Learning", Dec 1, 2018, IEEE, 2018 25th Asia-Pacific Software Engineering Conference (APSEC) (2018, pp. 11-20) (Year: 2018).*

* cited by examiner

*Primary Examiner* — Davoud A Zand

(74) *Attorney, Agent, or Firm* — Foley & Lardner LLP

(57) ABSTRACT

A method and related systems may generate and use a machine learning model that determines multiple outcome values for multiple message routes, where the model may account for unknown node values in one or more nodes during model creation. Some embodiments may then compare the multiple outcome values to select a target route for the message. Moreover, some embodiments may facilitate efficient network route determination through an adaptive weight node network by selecting different dynamic routing protocols based on critical thresholds.

20 Claims, 4 Drawing Sheets

VARIATIONAL OUTCOME-MAPPING MODEL FOR NETWORK ROUTING

SUMMARY

Networks enable global communication by allowing the transmission of messages between devices and users. Networks play a critical role in facilitating the exchange of information and coordination of activities worldwide. Effective routing is important to ensure reliable and efficient network communication. Suboptimal routing can lead to performance issues like increased latency and congestion. Furthermore, a computer system responsible for nodes of a network may rely on adaptive weight nodes that are controlled by other systems, resulting in a lack of visibility on resource use and resource costs associated with those adaptive weight nodes. This lack of visibility can exacerbate latency issues, throughput issues, and create unexpected issues for network users. Furthermore, prediction model accuracy may suffer because a threshold-passing change in a node weight may cause an immediate switch in the route that would have been calculated as the optimal network route.

Some embodiments may perform operations to reduce latency and reduce inaccuracies by selecting a network route through an adaptive weight node network mapped to a node weight state. In some embodiments, a computer system may determine a route through a network for a message in real time, where the computer system may respond and select different routes based on changes in the network. The computer system may collect a set of route options for messages and then generate a routing tree structure to represent the various combinations of route options. The computer system may then determine critical thresholds for adaptive weight node weights that would change the routes and generate multiple routing tree instances for those critical thresholds. Some embodiments may generate a collection of routing tree instances that includes example routing tree instances that are on multiple sides of a set of critical thresholds.

Some embodiments may train a prediction layer to determine different scenarios represented by multiple routing tree instances. In response to receiving a new candidate message, the computer system may use the trained prediction layer to then determine which route to use even as the parameters represented by the adaptive weight node weights change in real time. By using a machine learning model trained on a training set which includes scenarios on multiple sides of one or more critical thresholds, some embodiments will be able to dynamically route a network message even when external network costs or other parameters change in real-time.

Various other aspects, features, and advantages of the invention will be apparent through the detailed description of the invention and the drawings attached hereto. It is also to be understood that both the foregoing general description and the following detailed description are examples and are not restrictive of the scope of the invention.

Figure 1:
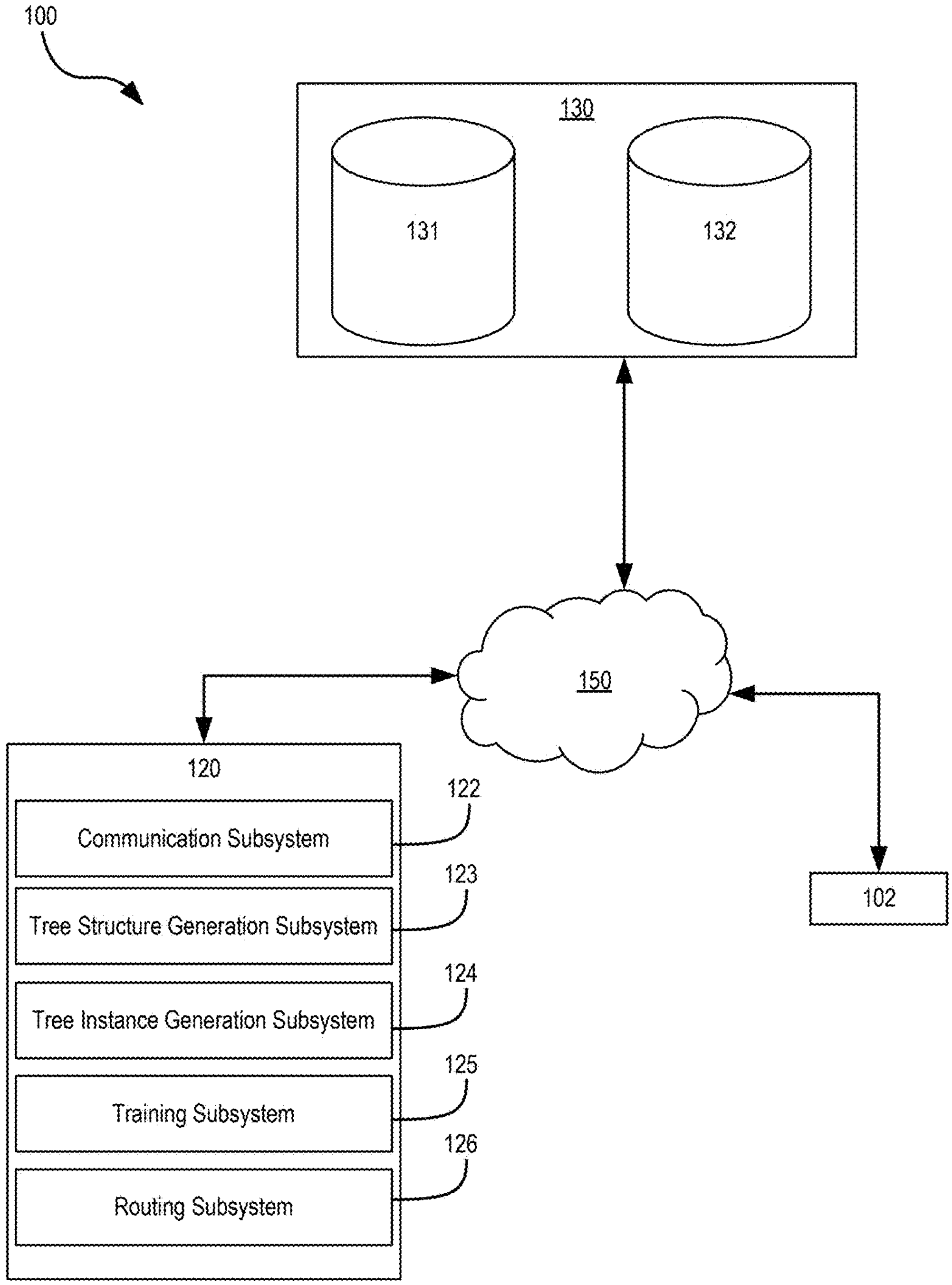
FIG. 1 shows an example system for determining a route in a network with variable control parameters by mapping aggregated performance metrics for different network scenarios, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 shows an example system 100 generating a network command by using descriptors of attributes or payloads, in accordance with one or more embodiments. A system 100 includes a client device 102 in communication with a server 120 via a network 150. As will be described further in this disclosure, the server 120 may perform operations to select a route for a message traversing a network by analyzing outcomes associated with multiple candidate routes along variable routes.

In some embodiments, the system 100 may determine a set of route options for a message and then generate a routing tree to represent the various combinations of route options that can form a route. A route option may include or represent one or more available actions that a system may take with respect to a message, such as sending the message to another physical or virtual node of a computer network, processing the message, transforming the message, performing an action based on the message, etc. By generating or updating a routing tree based on the route options, some embodiments may capture the various types of routes through which a message may take and provide a full set of training data for route determination operations. After generating the routing tree, some embodiments may then traverse the various routes of the routing tree to determine performance metrics for the routes and train one or more prediction layers of a prediction model to predict outcomes and select routes for messages. Some embodiments may then deploy the prediction layer to one or more computer systems for use.

For example, a computer system may receive instructions to train a prediction model to predict resource utilization of a particular route from a starting point of a route to an ending point of the route. In response, some embodiments may generate a routing tree structure by mapping, at each layer of a possible route, the route options available at that layer to nodes of the routing tree. In some embodiments, the route options include routes through adaptive weight nodes for which one or more weights may change in real-time or are otherwise not visible beforehand.

Some embodiments may generate routing tree instances representing specific weight states of the routing tree structure by retrieving weight boundaries and determining sensitive thresholds for the routing tree weights. For example, some embodiments may first obtain weight boundaries for a set of adaptive weight nodes. Some embodiments may then determine a set of sensitive thresholds of the routing tree structure by varying values of the set of adaptive weight nodes within the range bounded by the weight boundaries. A weight state for an adaptive weight may represent whether a sensitive threshold for the adaptive weight is satisfied or, if there are multiple sensitive threshold-defined states for a weight, what the state is. For example, if a node weight for a node may be modified between the values of zero and 2.0, where the sensitive thresholds for this node weight or equal to 0.5 and 1.5, a node weight state for that node may indicate that the node is below 0.5, between 0.5 and 1.5, or greater than 1.5.

These sensitive thresholds may represent critical values at which changes in an adaptive weight of the set of adaptive weight nodes cause a change in routes associated with an initial routing state. For example, a change in a weight value from being below a threshold to being above a sensitive threshold may cause an optimal network route to change from a first path to a second path. By determining these sensitive thresholds, a computer system may then generate routing tree instances that include weight states on each side of a sensitive threshold. By including weight states on each side of the sensitive threshold, a computer system reduces the risk of downstream training operations erroneously predicting that a particular network route is the optimal route. Additionally, a weight state may represent a particular configuration of weight values with respect to being below or above a combination of thresholds, allowing some embodiments to account for complex scenarios involving multiple adaptive weight nodes.

After generating routing tree instances, some embodiments may train, based on different routing tree instances of the routing tree, a prediction model to predict outcome states, where the prediction model may adapt to different weight states. For example, a computer system may (1) train a first neural network of the prediction model based on a first set of routing tree instances corresponding with a first weight state (e.g., all weights for an adaptive weight node are below a threshold of 0.02); and (2) train a second neural network of the prediction model based on a second set of routing tree instances corresponding with a second weight state (e.g., all weight values for the adaptive weight node are above a threshold of 0.02). Some embodiments may then assign the first neural network to a category representing the first weight state and the second neural network to a category representing the second weight state.

After receiving a candidate message and real-time node weight data concurrent with that candidate message, a computer system may select the appropriate portions of a prediction model for determining a route for the candidate message. For example, some embodiments may determine a first weight state based on real-time node weight data and then use the model parameters of a first neural network associated with that first weight state when determining the route. By selecting the portions of the prediction model to use based on real-time data, some embodiments may effectively account for various unexpected changes in node values and determine low-latency routes without performing expensive retraining operations. Furthermore, the use of a pretrained prediction model described in this disclosure will be able to permit a system to process hundreds of thousands of concurrent messages, such as messages related to modifying a network of databases or effectuating multiple database transactions.

The client device 102 may include one of various types of computing devices, such as a laptop, a tablet, a desktop, a payment kiosk, a payment terminal, a smartphone, etc. The client device 102 may send requests, responses, or other messages to the server 120 that may require communication with other computing devices or other electronic devices. Additionally, the server 120 may include various types of computing units, such as physically separate servers, virtual nodes hosted on one or more physical machines, or nodes on a cloud computing system. Applications, services, or other operations may use data provided by the client device 102, the server 120, or a set of databases 130 that includes a first networked database 131 and a second networked database 132. The set of databases 130 may include various types of databases, such as SQL databases, no SQL databases, graph databases, etc. In some embodiments, the server 120 may perform one or more operations related to a communication subsystem 122, a tree structure generation subsystem 123, a training subsystem 125, or a routing subsystem 126.

In some embodiments, the communication subsystem 122 may obtain program instructions, commands, queries, parameters, values, or other data from the client device 102 that may cause the retrieval of attribute descriptors, the generation of an input, or the execution of a command. For example, the communication subsystem 122 may receive requests to execute a database transaction from the client device 102 that causes the server 120 to query the set of databases 130. Furthermore, operations performed by the server 120 may use the communication subsystem 122 to send messages to the set of databases 130, the client device 102, or another computing device described in this disclosure. For example, the communication subsystem 122 may send out queries from the server 120 to the set of databases 130.

In some embodiments, the tree structure generation subsystem 123 may generate a routing tree structure based on a set of route options that start from a starting node of the routing tree. For example, some embodiments may gather eligible actions from various domains and possible states (e.g., doing nothing, blocking a message, using an authentication engine, using image-based verification engine, using SMS verification, etc.). Some embodiments may further collect logged metrics or other data associated with eligible actions, where such metrics may be incomplete or be associated with a boundary. Based on the collected values and boundaries, some embodiments may construct a routing tree structure indicating action sequences for a message.

In some embodiments, the tree instance generation subsystem 124 may generate multiple routing tree instances based on the routing tree structure. For example, some embodiments may assign a default set of values to the variable weights of a routing tree within the respective boundaries for the routing tree. Some embodiments may then synthesize additional samples by varying the variable weights within their respective boundaries. Some embodiments may further determine sensitive thresholds that would cause a message route to change and ensure that the collection of synthesized samples includes values that both satisfy and do not satisfy the sensitive thresholds.

Some embodiments may traverse each respective route of each synthesized routing tree instance to a respective leaf node of the routing tree instance to determine a respective total performance metric associated with the respective route. The tree instance generation subsystem 124 may then determine a set of performance metrics associated with the routing tree and use this set of performance metrics to determine outcome values. Some embodiments may determine a set of routing tree states associated with different routes, where a routing tree state may include a route and an outcome value or other outcome indicators associated with the route.

In some embodiments, the training subsystem 125 may train a prediction model (e.g., a set of prediction layers, a full predictive neural network, etc.) to predict performance metrics by using the set of performance metrics as training data. The training subsystem 125 may train a machine learning model to predict outcome values associated with one or more routes based on both data related to a candidate message and data related to an external network. Various types of machine learning models may be trained and may include multiple types of machine learning models. For example, some embodiments may use a mixture-of-experts machine learning model that may be split into multiple sub models or be integrated as one unified model.

In some embodiments, the routing subsystem 126 may use a trained prediction layer (e.g., a trained set of neural network layers) to determine outcome values for different possible routes. The routing subsystem 126 may then direct a set of messages through one or more routes associated with a corresponding aggregated outcome value associated with the one or more routes. A prediction layer may perform operations such as determining a route cost, a probability of successful authorization, or a malicious activity probability related to a route (e.g., a probability of a network security issue associated with the route, fraud probability associated with the route, etc.). The routing subsystem 126 may then send the message down a target route, where the target route is selected based on a minimum cost amongst the route costs for multiple routes.

Figure 2:
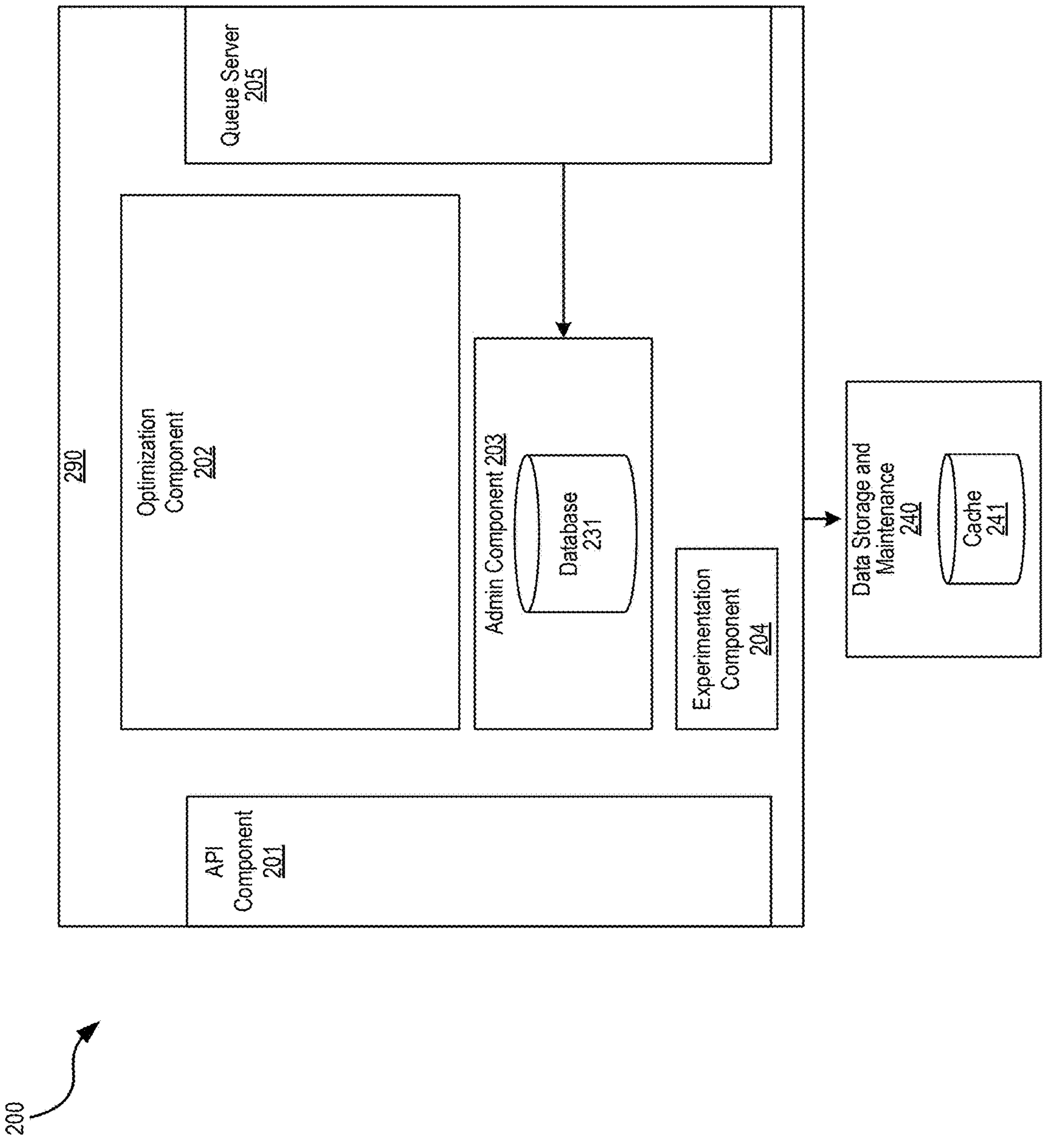
FIG. 2 shows an example architecture for determining a route in a network with variable control parameters, in accordance with one or more embodiments.

FIG. 2 shows an example architecture for determining a route in a network with variable control parameters in accordance with one or more embodiments. In some embodiments, a system 200 includes an optimization engine 290 where the optimization engine 290 includes an API component 201, an optimization component 202, an admin component 203, an experimentation component 204, and a queue server 205.

In some embodiments, the optimization component 202 may determine what eligible operations may be performed, such as authorization operations or authentication operations. The optimization component 202 may also evaluate operations and score the viability of these operations. Some embodiments may also receive updates to a boundary for an adaptive weight node For example, some embodiments may score operations based on a set of malicious-activity-detection criteria and remove pathways to performing such operations (which may be reflected by constructing a routing tree that does not include route options representing these operations). In some embodiments, the optimization component 202 may also execute a machine learning model to be used as or as part of a prediction layer, where the prediction may serve as a dynamic routing protocol to determine message routes. The optimization component 202 may use the prediction layer to score a route, determine costs associated with that route (e.g., computing costs, network resource costs, other types of costs) or determine metrics associated with the route (e.g., determine an expected profit). In some embodiments, the optimization component 202 may apply user-specific configuration or updates to a machine-learning model such as determining whether a latency tolerance is satisfied, a malicious activity tolerance is satisfied, etc.

The optimization component 202 may also filter out or remove route options from consideration when evaluating different routes. For example, some embodiments may determine that a set of gateways is unavailable for a certain transaction type. Some embodiments may refer to a data structure, such as an enumerated list, to determine which route options should be removed or not used when generating or updating a route for a message. In some embodiments, the optimization component 202 may filter routes so that a subset of routes is removed or a subset of routes is permitted. For example, some embodiments may generate the optimization component 202 to satisfy a user-provided criterion that only routes that include a 3DS challenge operation are permitted.

In some embodiments, the optimization component 202 may train or use a prediction layer that includes a set of machine learning models. For example, some embodiments may use a multi-task model, where the architecture of the multi-task model may include a shared router network to dispatch queries and related input data across multiple specialized expert networks (e.g., a network having 2 billion parameters), where one or more expert networks are activated based on a learned gating mechanism that evaluates input features and task embeddings. In some embodiments, the multi-task model permits multiple sequential model calls and multiple parallel requests for that model. Some embodiments may use a model that may take into account multiple parameters and different changing node weights, such that route-changing alterations in node weight may still be accurately modeled with respect to an outcome score.

As another example, some embodiments may first determine a set of candidate actions and filter the set of candidate actions into permitted actions acceptable to a region or operating environment. Some embodiments may recognize that one or more of the candidate actions may have an unknown cost, be associated with an unknown metric, or otherwise be associated with an unknown value that will influence a final outcome. Some embodiments may account for this variability by simulating multiple scenarios with different values (e.g., different node weights) assigned for these unknown actions. In many cases, because the candidate actions taken at one portion of a route can restrict or enable additional actions down the route, some embodiments may also keep track of whether one or more sensitive, route-changing thresholds are satisfied during model training operations. In cases where different values may change a route (e.g., changes in network cost changing which gateway are selected), some embodiments may determine different sub-models for different scenarios in which different combinations of thresholds are satisfied or not satisfied. After training a prediction layer with these synthesized scenarios, some embodiments may then predict a route for a message by providing a prediction layer with an adaptive weight data (e.g., a measure of actual network cost, a measure of average latency for an external network through which a message may travel, etc.).

As another example, some embodiments may determine a route for routing a device access request (e.g., a most optimal route based on one or more optimization criteria) by generating a machine learning model to evaluate routes and using the model to select a route for the access request. To generate the model, some embodiments may collect a set of candidate actions for processing the device access request, such as (i) validating the request (e.g., verifying that the request satisfies predefined structural and semantic criteria before the request is further processed by the system or one or more applications), (ii) performing one or more authentication methods (e.g., routing the request via a third-party authenticator system, performing SMS or email verification, etc.), (iii) sending the request to one or more gateways or other type of nodes (e.g., routing the request to a third-party service hosting a device to be accessed or enables remote access capabilities to the device or one or more applications of the device), or (iv) other actions. In cases where one or more of the actions is associated with a set of variable parameters that may influence the optimal route to be taken, some embodiments may then synthesize multiple possible scenarios based on different values of the set of variable parameters and simulate route execution within the respective scenarios. For example, if a request route involves the use of a third-party network having variable reliability, some embodiments may simulate scenarios having different reliability values. Some embodiments may then train a prediction model based on the synthesized scenarios and their corresponding routes. Some embodiments may then provide these input features to the prediction model to obtain a set of probability values related to malicious activity, software error, or hardware failures, where such probability values may be used to determine outcome scores that correspond with each possible outcome of a set of outcomes. Some embodiments may then sort these outcome scores and select the route for a request that satisfies a criterion to select a maximum outcome score of the outcome scores for the set of outcomes.

As another example, some embodiments may determine a route for routing a transaction request associated with a merchant or other user along a multi-network route that involves the use of networks that may provide limited visibility on network rates or other parameters. Some embodiments may first train a prediction model after identifying eligible actions and identifying which actions include an unknown parameter which may influence what route is taken. An eligible action may include (i) sending a message through one or more gateways for processing the transaction request (e.g., selecting third-party gateway or other gateway that supports one or more authentication methods to be employed), (ii) one or more transaction authentication operations (e.g., use of PAN, a specific network token, 3DS, D2A, authentication methods used for content or device access requests described herein, or other authentication operations), (iii) rejecting a transaction request, or other actions. A route through a payment network may involve operations that rely on variable parameters. For example, sending the transaction request through a gateway for another network may involve an unknown network cost that may change without notice, and performing certain authentication operations may involve the use of third-party services having a variable additional cost or impact on profitability. Some embodiments may simulate the impact of these changes by generating multiple training instances involving different values for the network cost, variable additional cost, or other variable parameters that could influence the outcome of a transaction request's route. Some embodiments may also detect sensitive thresholds for these variable parameters for downstream use, such as prediction model selection. Some embodiments may then train a prediction model based on the training instances. After receiving input data for a transaction request, some embodiments may then predict a route for the transaction request by providing the prediction layer with the input data and network data reflecting the actual network cost, variable additional cost, or other variable parameters, where this network data may be used to configure the prediction model or select a portion of the prediction model for use.

In some embodiments, the admin component 203 may permit the updating and management of user-level personalization for optimization operations. For example, some embodiments may support a configurable profit margin, tolerance for latency, tolerance for malicious activity, and transaction risk analysis exemption, etc. For example, the admin component 203 may receive user messages controlling a latency tolerance and modify which outcomes and routes are viable for a message based on the latency tolerance. In some embodiments, the admin component 203 may expose an endpoint to permit queries indicating the status of a user (e.g., enrollment status, activity status, etc.). The admin component 203 may also update boundaries for node weights for nodes representing different types of eligible actions.

In some embodiments, the admin component 203 may receive a list of candidate routes through a routing tree. In some embodiments, the optimization component 202 may then use these candidate routes in conjunction with message-related data to select which of the candidate routes to use as the target route for routing a message. Furthermore, the optimization component 202 may use the objective function to determine an outcome score used to select the candidate route. In some embodiments, the optimization component 202 may determine the score determination, may be performed asynchronously, and may be retrieved during actual operations. The admin component 203 may also store user settings for specific users in a database 231, such as data related to a user-defined maximum cost threshold, a user-defined maximum latency threshold, etc.

In some embodiments, the experimentation component 204 may be used to modify or override parameters of other subsystems of the system 200 to enable changing message routes to routes that are not an original target route. For example, some embodiments may use the experimentation component 204 to initiate Thompson sampling operations to compare different sets of routes to validate the effectiveness of a target route over a non-target route where the majority of messages may be routed over the target route, and a smaller number of messages may be routed over the non-target route. In some embodiments, the experimentation component 204 may observe, log, and alert operations based on message routes and outcomes of message routes.

In some embodiments, messages and message-related data may be received by an API component 201 of the system 200. For example, the API component 201 may obtain action-related information associated with a message, such as user identifiers of a user initiating the message, a device identifier of a device used to obtain the message, other types of identifiers, L3 data related to L3 transactions, etc. The API component 201 may then provide some or all of the received data to other components of the system 200.

In some embodiments, the system 200 may include a queue server 205, where the queue server 205 may act as a middleware layer with external computer systems. For example, the queue server 205 may perform message buffering during peak loads or connectivity issues, ensuring ordered processing to prevent lost messages, managing automatic retries of messages that are rejected or failed to reach a target destination, etc. In addition, the queue server

205 may handle maintaining message records for system recovery and log events for tracking and performance monitoring.

In some embodiments, the data storage and maintenance subsystem 240 may receive outputs. For example, the data storage and maintenance subsystem 240 may receive outputs from the optimization component 202, the admin component 203, or the experimentation component 204. Some embodiments may store output data in a cache 241, which may permit easy retrieval of one or more values used or described in this disclosure. For example, some embodiments may retrieve from the cache 241 outcome scores, machine learning model parameters for one or more prediction layers, metrics, etc.

Figure 3:
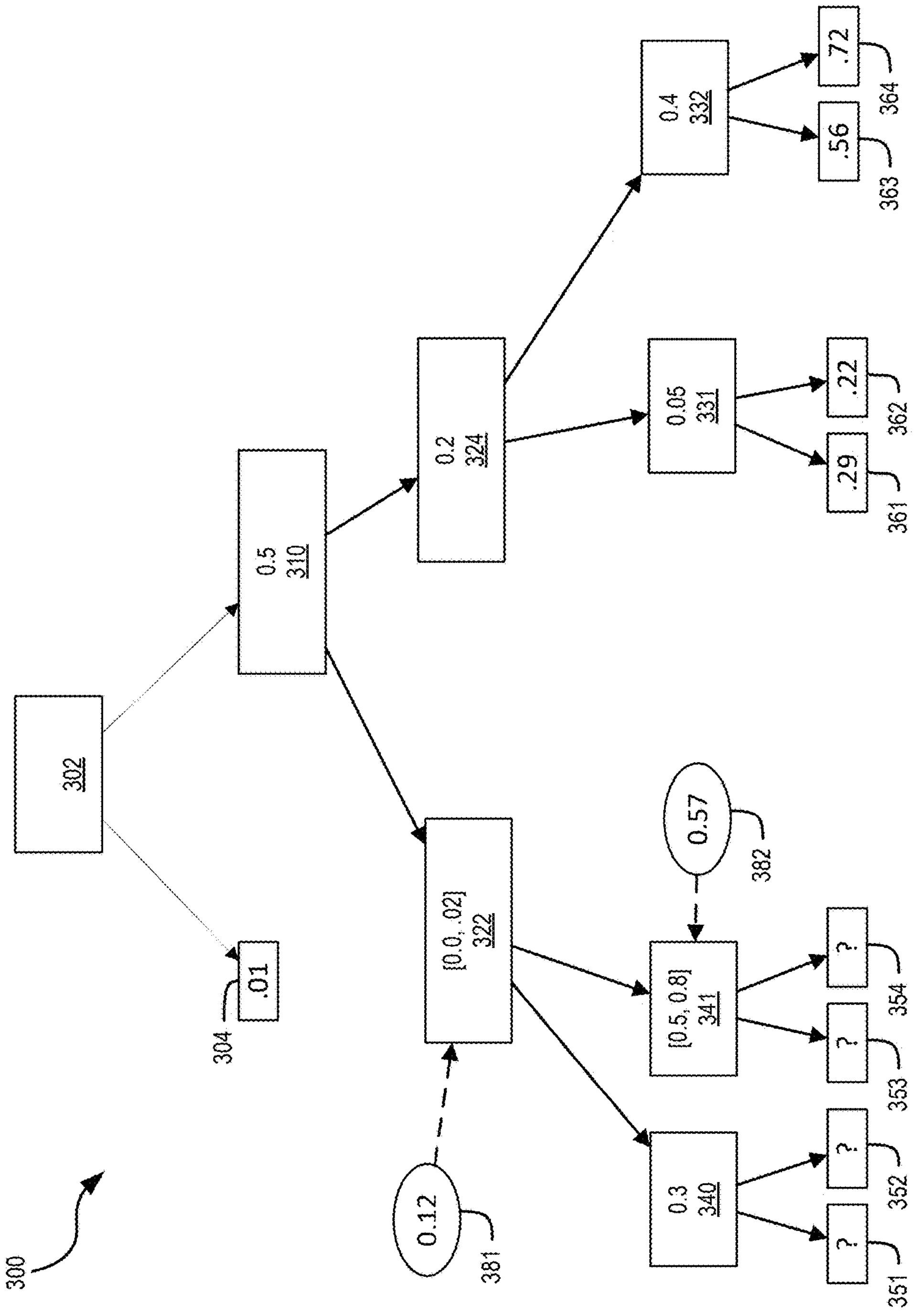
FIG. 3 shows a conceptual diagram of a routing tree structure used to generate multiple routing tree instances, in accordance with one or more embodiments.

FIG. 3 shows a conceptual diagram of a routing tree used to determine a route based on performance metrics in accordance with one or more embodiments. Some embodiments may generate a routing tree 300 and use this routing tree to evaluate outcomes associated with different routes. The routing tree includes node 302, node 310, adaptive weight node 322, node 324, nodes 340, adaptive weight node 341, node 331, node 332, leaf node 304, leaf node 351, leaf node 352, leaf node 353, leaf node 354, leaf node 361, leaf node 362, leaf node 363, and leaf node 364. A node, such as a set of leaf nodes shown in FIG. 3 (e.g., leaf nodes 351-354 and leaf nodes 361-364) may be associated with a single outcome value or a range of outcome values.

The nodes may represent physical devices or virtual devices or message routing or processing points for a message. For example, the node 302 may represent an initial decision point at a first receiving device to determine whether to reject the message. The node 310 may represent a node or process point for performing a gateway selection operation where the adaptive weight node 322 may represent a first gateway and the node 324 may represent a second gateway. In some embodiments, gateways represented by the adaptive weight node 322 and the node 324 may respond to incoming messages in various ways, such as by initializing downstream applications or services, effectuating database transactions, etc. The nodes 340 and 341 may represent different authorization operations that may be performed by a gateway represented by the adaptive weight node 322. For example, a gateway or decision point performed by the gateway may be represented by the adaptive weight node 322 and outcome decisions may include different authorization approaches and different authentication approaches.

A leaf node may represent a final outcome for a message route, such as an acceptance of a message or a rejection of the message. For example, the leaf node 304 may be associated with a set of outcome values for initial rejection. As described elsewhere in this disclosure, an outcome value may depend on the various types of metrics being calculated, and may represent or include values related to network performance, computational resource use, expected total value or cost from a route, expected profit, etc. Furthermore, some embodiments may select a target route for a message based on the outcome values. Some embodiments may determine a target route based on determining a maximum value or minimum value associated with the different outcome values.

As shown by the routing tree 300, the node 302 may point to either the leaf node 304 or the node 310. The node 310 shows that a message may be sent to a route option leading to adaptive weight node 322 representing a first gateway or to a path leading to node 324 representing a second gateway. The adaptive weight node 322 may include or be associated with a variable node weight that ranges between 0.0 and 0.2, which may make it difficult to predict which route will be taken. Based on the value of the adaptive weight node 322, some embodiments may select a message route that travels through the adaptive weight node 322 or instead a route that skips the adaptive weight node 322 and travels through the node 324.

The adaptive weight node 322 may then send or process a message based on a path to a node 340 or a path to the adaptive weight node 341. The adaptive weight node 341 may include or be associated with a variable node weight that ranges between the boundaries 0.5 and 0.8. In some embodiments, a computer system may choose a message route that passes through the nodes 340 or through the adaptive weight node 341 based on the value of variable node weight for the adaptive weight node 341. The node 340 points to a leaf node 351 or a leaf node 352, both of which would be associated with variable final outcome values that would depend on the node weight value for the adaptive weight node 322. Similarly, the adaptive weight node 341 may point to the leaf nodes 353 and 354, both of which may be associated with respective final outcome values that would depend on both the variable weight values for the adaptive weight node 322 and the adaptive weight node 341.

Alternatively, the node 324 may send or process a message based on a path to a node 331, where the node 331 itself may point to the leaf node 361 having an outcome value equal to 0.29 or the leaf node 362 having an outcome value equal to 0.22. Furthermore, the node 324 may then send or process a message based on a path to a node 332, where the node 332 itself may point to the leaf node 363 having an outcome value equal to 0.56 or the leaf node 364 having an outcome value equal to 0.72.

Because the adaptive weight node 322 and the adaptive weight node 341 have variable weights, predicting final outcome scores for the leaf node 351, leaf node 352, leaf node 353, or leaf node 354 may be more complex. In many cases, simulating all combinations of all likely values as part of a training operation may be infeasible due to the sheer number of possible examples. In addition to changing the number of possible outcome values to consider, changes in the node weight may cause a change in a recommended outcome route entirely. The change in an outcome route may represent a discontinuity of an objective function used to determine an outcome value. Such discontinuities, if unaddressed, may negatively affect the accuracy of a machine learning model.

To overcome these challenges, some embodiments may determine a first sensitive threshold 381 and a second sensitive threshold 382. Some embodiments may determine that, at these sensitive thresholds, the adaptive weight node 322 and the adaptive weight node 341 may cause a switch in a route. By tracking these sensitive thresholds, some embodiments may then determine that a set of synthesized training data will include scenarios in which the first sensitive threshold 381 and the second sensitive threshold 382 are satisfied and scenarios in which the first sensitive threshold 381 and the second sensitive threshold 382 are not satisfied.

In some embodiments, a gateway may elect to use a network token (NT) as part of an authorization process or a personal account number (PAN) as part of the authorization process, where the selection of different authorization processes may be represented as different nodes of a routing tree. Similarly, a gateway may perform different types of authentication approaches, such as using either a direct-to-authorization operation (D2A) or initializing a more complex 3DS authorization operation.

Flowchart

Figure 4:
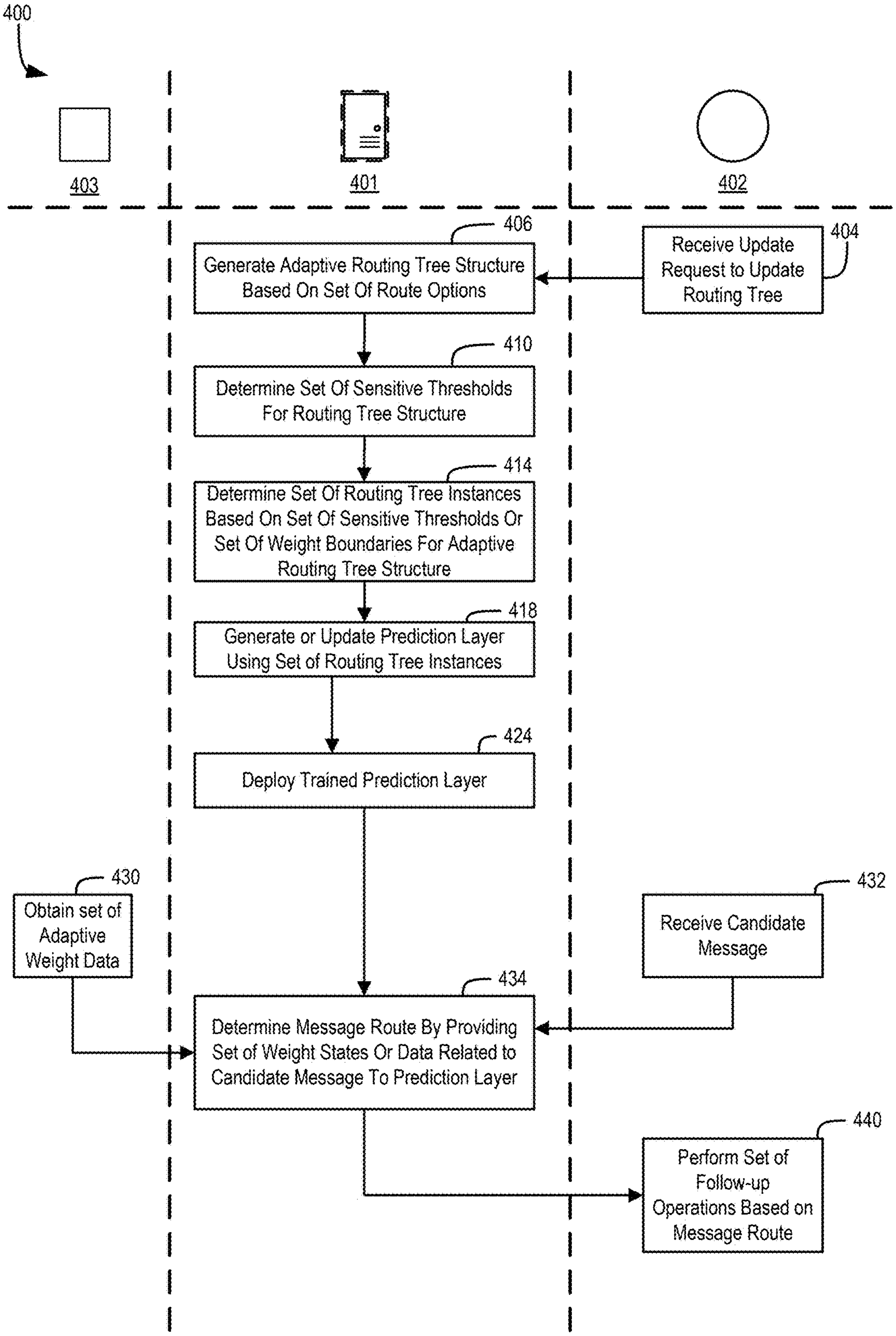
FIG. 4 shows a flowchart of a process for determining a route in a network with variable control parameters, in accordance with one or more embodiments.

FIG. 4 shows a flowchart of a process for determining a route based on performance metrics in accordance with one or more embodiments. The process 400 is shown as a swimlane flowchart in which column 401 represents operations performed by a server system, column 402 represents operations performed by a client system, and column 403 represents operations performed by another computer system. It should be understood that descriptions of an operation being performed by a system are exemplary and non-limiting, such that operations described as being performed by one system may instead be performed by another system unless described otherwise. For example, operations performed by the other computer system represented by column 403 may instead be performed by a server system or client system.

Some embodiments may receive a request to update a routing tree as indicated by block 404. In some embodiments, operations of the block 404 may be performed by a client system, as shown in column 402. The client system may receive instructions that cause the client system, a server system, or another computer system to perform one or more routing tree generation operations or other operations described in this disclosure.

Some embodiments may generate an adaptive routing tree structure based on a set of route options as indicated by block 406. In some embodiments, operations of the block 404 may be performed by a server system, as shown in column 401. Some embodiments may generate a routing tree structure indicating information for each physical or virtual node of a network or a decision point for processing a message in the network. For example, starting from a root node, a computer system may determine which destinations are likely or processing operations are viable to treat as another route option leading to another node. The computer system may recursively apply this process of each possible node until reaching a stopping criteria to generate a tree structure, where the tree structure may indicate nodes having non-changing node weights ("non-adaptive weight nodes").

Some embodiments may determine a set of sensitive thresholds based on the adaptive routing tree structure and a set of weight boundaries for adaptive weight nodes of the adaptive routing tree structure, as indicated by block 410. In some embodiments, operations of the block 404 may be performed by a server system, as shown in column 401. Some embodiments may retrieve a set of weight boundaries for a set of adaptive weights, where the adaptive weights correspond with a set of adaptive weight nodes for a routing tree structure. The set of adaptive weight nodes may represent physical or virtual nodes or decision points for a network that is outside the control of the routing tree. For example, the set of adaptive weight nodes may include a first node that represents a decision to send a message down a sub-network for processing, where the network cost of the sub-network may change on a regular basis with minimal transparency. However, even if this network cost may change with minimal transparency, the network cost is bounded within a particular range or may otherwise be modeled as falling within a weight boundary based on historically-received data.

Some embodiments may perform one or more operations to determine the sensitive thresholds for a routing tree. For example, some embodiments may use entropy-based methods, objective function gradient methods, cross-validation techniques, statistical significance testing, sample weight distribution analysis methods, etc. For example, some embodiments may use measures by determining changes in a decision tree entropy for one or more nodes and the route options at the one or more nodes. Alternatively, some embodiments may determine critical points by detecting rapid changes in an objective function value. For example, some embodiments may detect substantial changes in the gradient of a routing tree with respect to node weights or other node-related parameters, where changes indicate regions in a tree parameter space corresponding with critical values.

Some embodiments may determine a set of routing tree instances based on a set of sensitive thresholds or set of weight boundaries for an adaptive routing tree structure, as indicated by block 414. In some embodiments, operations of the block 404 may be performed by a server system, as shown in column 401. A routing tree instance may be generated by populating the adaptive weight nodes of a routing tree structure with a specific set of parameters. In the case of training a model, the collection of routing tree instances should include, for each respective sensitive threshold of a tree structure, values that both satisfy and do not satisfy the respective sensitive threshold.

Some embodiments may generate or update a prediction layer using a set of routing tree instances, as indicated by block 418. In some embodiments, operations of the block 404 may be performed by a server system, as shown in column 401. Some embodiments may train a prediction layer that includes one or more machine learning models, statistical prediction models, etc. Once trained with a set of routing tree instances and training weight states associated with a set of routing tree instances, the prediction layer may predict outcome states for different routes through which a message may travel. Some embodiments may use this prediction layer as a dynamic routing protocol to determine routing for messages.

As described elsewhere in this disclosure, some embodiments may implement a unified model approach for the machine learning model of a prediction layer used to determine a route for a message. For example, some embodiments may use a multi-task model that may accommodate different adaptive weight node weights for a routing tree and may output a route for a message traversing the routing tree without selecting sub-models or otherwise explicitly determining weight states. For example, some embodiments may include a first routing tree instance associated with a first training weight state and a second routing tree instance associated with a second training weight state. Some embodiments may then train a unified model on a data set that includes both the first routing tree instance and the second routing tree instance without separating or otherwise indicating qualitative differences between the two routing tree instances. For example, some embodiments may train the unified model on the first routing tree instance in a first training iteration of a training stage and train the unified model on the second routing tree instance in a second training iteration of the same training stage. Some embodiments may use this unified model approach for simplicity and a greater likelihood of fast computation.

Some embodiments may implement a switching model approach to using a machine learning model to determine message routes, where different sub-models may be selected for use based on different weight states associated with those different sub-models. During training, some embodiments may be associated with different portions of a trained model or different trained models with different weight states. For example, a first set of tree states may be associated with a first set of weight states that indicates that a set of sensitive thresholds for the tree is satisfied by values of trees in the first set of tree states. Some embodiments may then assign a first state-based category to a machine learning model trained using the first set of tree states or a first trained sub-model of a machine learning model trained using the second set of tree states. Furthermore, some embodiments may determine that a second set of tree states may be associated with a second set of weight states that indicates that a first sensitive threshold for the tree is satisfied and that a second sensitive threshold for the tree is not satisfied. Some embodiments may then assign a second state-based category to a machine learning model trained using the second set of tree states or a second trained sub-model of a machine learning model trained using the second set of tree states.

Some embodiments may use a soft routing tree parameter for a neural network. For example, some embodiments may train a prediction layer that includes a set of neural network layers, where neural units of the set of neural network layers includes a set of soft decision tree functions (e.g., a SoftMax layer in the last layer of a neural network). In some embodiments, the training operations may update the parameters set of soft decision tree functions, where the use of an neural network having a soft layer may be helpful in applications where the speed of processing is a high priority Furthermore, some embodiments may train a prediction model having a SoftMax function based on a vector of a neural unit, where the use of vector-based operations permits or increases the efficacy of architecture to parallelize and scale neural network operations.

Some embodiments may update an objective function used to determine arc values or other methods of calculating outcome values based on follow-up actions related to messages. For example, some embodiments may detect an increase in transaction reversals, where a transaction reversal may be categorized as a negative action. In response to detecting these types of messages, some embodiments may generate new outcome scores for these messages to represent the negative outcome. For example, some embodiments may obtain a set of indicators of payment reversals, modify initial outcome values associated with these messages to updated outcome values that reflect the negative outcome. Some embodiments may then retrain a prediction model based on these updated outcome values. After re-training the prediction model, some embodiments may then redeploy the prediction model using deployment operations indicated elsewhere in this disclosure. Some embodiments may also search for similarities in message content or metadata associated with messages to determine if there is a set of features unique or largely unique to the messages associated with reversals. Some embodiments may then update an objective function to discourage this set of features.

Some embodiments may deploy the trained prediction layer, as indicated by block 424. In some embodiments, operations of the block 424 may be performed by a server system, as shown in column 401. In some embodiments, the deployment target may be a preconfigured destination. For example, be preconfigured to select a particular container or set of containers to update with model parameters corresponding with one or more prediction layers. Alternatively, some embodiments may obtain one or more input values indicating a deployment target. In some embodiments, a container executing on a cloud computing platform may be the deployment target. In response to a determination that the deployment target is on another computer system, some embodiments may deploy the updated prediction model parameters to the other computer system. Alternatively, in response to a determination that the deployment target is a client device, such as the client device that initially sent the update request, some embodiments may update the client device. Furthermore, some embodiments may deploy the set of prediction layers or other set parameters for a prediction model on the same set of computer systems used to train the prediction model. When deploying a prediction model or portions of the model, some embodiments may determine which specific values to deploy based on other data. For example, a computer system may deploy a prediction layer that includes a neural network to a first cluster based on environmental parameters of the cluster.

Some embodiments may selectively deploy machine learning models based on which set of thresholds are predicted to be satisfied. Some embodiments may then redeploy one or more machine learning models based on changes in these thresholds or changes in the likelihood of these thresholds being satisfied. For example, some embodiments may switch out machine learning models or the parameters for selection operations for these machine learning models if a set of sensitive thresholds is detected to have changed. Some embodiments may detect a result indicating that one or more thresholds of a set of sensitive thresholds are triggered based on obtained node weight data. In response, some embodiments may deploy a trained machine learning model associated with that set of node weight states.

Some embodiments may obtain a set of adaptive weight data, as indicated by block 430. In some embodiments, operations of the block 430 may be performed by another computer system, as shown in column 403. Some embodiments may obtain weight data from external networks or derived adaptive weight data from measurements related to external networks. For example, some embodiments may send and receive data with an external network API that communicates the network cost of using the external network. In response, some embodiments may set an adaptive weight node weight associated with the adaptive weight node representing the decision point to use the external network or a virtual or physical node that sends data to the external network or makes decisions on whether to send data to the external network. Various types of external network weight data may be obtained, such as information related to a network utilization cost, latency values, reliability values, signal quality values, values related to types of messages that are permitted or not permitted, values indicating likelihood of rejection or the execution of authentication operations, etc. For example, some embodiments may obtain a set of latency metrics and use the obtained set of latency metrics as node weight data. Some embodiments may then use this obtained node weight data as inputs or to select machine learning models, as indicated elsewhere in this disclosure.

Some embodiments may obtain a set of messages indicating different metrics where these different metrics may be associated with node data or be used to determine weight boundaries associated with nodes. For example, some embodiments may obtain real-time data and detect changes in the delay or acceptance of a message such that a message that once would have been rejected by an external network due to having too high of a latency value would instead be accepted. Some embodiments may then update weight boundaries to an updated set of weight boundaries to indicate the new permitted delay for a message. Some embodiments may then trigger one or more retraining operations to generate a re-trained prediction model. For example, some embodiments may generate a new set of tree states and corresponding outcome values such that a retrained prediction model may account for these permitted delays and select a route that includes the updated external network even if the prediction model would not have selected this route had no update been made. Some embodiments may then update one or more deployed versions of the updated prediction model.

Some embodiments may obtain measurements, metrics, or data from other data sources or entities capable of monitoring external networks. Some embodiments may then intelligently update a network boundary based on information provided by these external data sources. For example, some embodiments may receive an indication from a network oracle indicating that a weight corresponding with a variable node exceeds a set of weight boundaries. Some embodiments may then update the set of weight boundaries based on the syndication. For example, some embodiments may receive an indication that a network cost for using a network is equal to 2.5, where the network cost is supposed to range between 0.0 and 1.5. In response, some embodiments may update the set of weight boundaries for representing entry into this network to be between zero and 1.5.

Some embodiments may receive a candidate message, as indicated by block 432. In some embodiments, operations of the block 432 may be performed by a client system, as shown in column 402. In some embodiments, a client device may send a candidate network message that is to be routed through a network, where the candidate network message may include text, characters, category values, etc. For example, the client device may initiate a message that includes a request to be routed through a network that is to initialize an application, update a set of databases, etc. In some embodiments, the message may be directed through a network such that different portions of the network may be under the partial or full control of different entities that do not openly communicate all the parameters of the network with each other. For example, a candidate network message may be routed through a network that permits routing the message through a set of nodes controlled by a single entity or a network of nodes controlled by up to five different entities.

Some embodiments may determine a message route by providing the set of weight states and data related to the candidate message to the prediction layer, as indicated by block 434. In some embodiments, operations of the block 434 may be performed by a server system, as shown in column 401. Some embodiments may provide, as inputs to a machine learning model, the machine learning model with weight data, weight state values, or input state data related to a message. The machine learning model may then determine values associated with different routes or select a particular route for the message through an adaptive network characterized by the weight data or weight state values. Alternatively, or additionally, some embodiments may use weight values, weight states, message-related input values, or other values described in this disclosure as configuration parameters for a machine learning model to determine one or more model parameters of the machine learning model. For example, some embodiments may use weight state data to determine configuration parameters for a machine learning model.

Some embodiments may use the set of prediction layers trained using operations described in this disclosure to determine which route has an optimal predicted performance metric and select this route for the path that a message should take. For example, some embodiments may determine, using a trained machine learning model, that a first route is associated with a latency equal to 50 milliseconds (ms) and that a second route is associated with a latency equal to 70 ms. In response, some embodiments may choose the first route as the target route through which to route one or more messages.

Some embodiments may determine a set of weight states based on the set of adaptive weight data. In some embodiments, a computer system may use real-time node weight data to determine a weight state for a set of adaptive weight data. For example, some embodiments may obtain data indicating that a first network cost is equal to 0.34 for a first adaptive weight node representing a node of a first external network and indicating that a second network cost is equal to 1.2 for a second adaptive weight node representing a node of a second external network. Some embodiments may determine that a corresponding weight state for the first adaptive weight node indicates that a maximum threshold assigned to the first network equal to 0.5 is satisfied, and that a corresponding weight state for the second adaptive weight node indicates that a maximum threshold assigned to the second network equal to 1.0 is not satisfied. Some embodiments may use this collection of weight states to select which machine learning model from a plurality of candidate machine learning models to use. By selecting different machine learning models based on different weight states, some embodiments may overcome issues that certain machine learning models have with respect to discontinuities in an objective function output that would result from changing which route to use for a message.

Some embodiments may select a particular model or sub-model to use based on whether a particular combination of sensitive points on a decision tree are satisfied. For example, some embodiments may assign a first state-based category to a candidate weight state based on a comparison between the candidate weight state with a set of sensitive thresholds. In response to determining that the first state-based category is assigned, some embodiments may then select a first trained model as a dynamic routing protocol in lieu of different dynamic routing protocols for determining a message route.

As described elsewhere, a client device may have values related to establishing a set of criteria for a proposed route, such as a maximum threshold, minimum threshold, target set of categories, restricted set of categories, etc. Some embodiments may determine that one or more outcomes violate one or more of these obtained criteria-establishing values. For example, some embodiments may determine that a first set of outcomes violates a maximum threshold and that a first recommended route with an outcome of the first set of outcomes. In response, some embodiments may select, as a target route, a second route that does not and in any outcomes of the first set of outcomes.

While some embodiments may use a server-side prediction model to determine a target route for a message, other embodiments are possible. For example, in the case that a set of prediction layers trained using operations described for block 418 is deployed to a client-side version of a predictive neural network, the client-side version of the predictive neural network may be used to determine a target route for a message.

Some embodiments may perform a set of follow-up operations based on the message route as indicated by block 440. In some embodiments, operations of the block 440 may be performed by a client system, as shown in column 402. Various types of follow-up operations may be performed, including but not limited to authentication operations (e.g., operations that request that a user provide a specific code, select a key image or key phrase, etc.). Some embodiments may also display one or more values based on an indication that a message was accepted or processed in a target manner.

Some embodiments may build reports from data collected on the routes through which messages travel and determine if predicted metrics or other values matches with actual metrics or other values Some embodiments may retrain or otherwise update a machine learning model based on differences or indications that defined boundaries or limitations about value distributions for external networks (e.g., thresholds) are inaccurate. Additionally, some embodiments may be configured to attempt different routes when retrying to send a message, such as by using a prediction layer to select a different route for a version of the same first message or a different message from the same starting node. Furthermore, some select different routes as part of an experimentation protocol. Various experimentation protocols may be implemented to explore different routes, such as Thompson Sampling, where the reward for exploring different routes may be based on reduced cost, reduced latency, other network metrics, or other types of aggregated metrics.

The above-described embodiments of the present disclosure are presented for purposes of illustration and not of limitation, and the present disclosure is limited only by the claims which follow. Furthermore, it should be noted that the features and limitations described in any embodiment may be applied to one or more other embodiments herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Furthermore, not all operations of a flowchart need to be performed. In addition, the systems and methods described herein may be performed in real time. It should also be noted that the systems and/or methods described above may be applied to, or used in accordance with, other systems and/or methods.

Furthermore, the computing devices described in this disclosure may be any type of computing device unless otherwise stated, including, but not limited to, a laptop computer, a tablet computer, a hand-held computer, and/or other computing equipment (e.g., a server), including "smart," wireless, wearable, and/or mobile devices. For example, the client device 102 of FIG. 1 may be a smartphone, another type of mobile computing device, or a payment terminal. Furthermore, the embodiments described in this disclosure may include an individual device that performs some or all the operations described in this disclosure. Alternatively, other embodiments may include multiple computing devices acting collectively to perform some or all the operations described in this disclosure.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on one or more non-transitory, machine-readable media (e.g., a set of machine-readable storage media), such as an electronic storage medium. Furthermore, the use of the term "media" may include a single medium or combination of multiple media, such as a first medium and a second medium. One or more non-transitory machine-readable media storing instructions may include instructions included on a single medium or instructions distributed across multiple media. For example, non-transitory media may include program instructions that are written as source files or written in machine-executable program code. The processing devices may include one or more devices configured through hardware, firmware, and/or software to be specifically designed for the execution of one or more of the operations of the methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include one or more relational databases. Alternatively, or additionally, the set of databases or other electronic storage used in this disclosure may include one or more non-relational databases.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communication networks or combination of communication networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storage may include one or more non-transitory machine-readable media (e.g., storage media) that electronically stored information. The storage media of the electronic storages may include one or both of (i) system storage that is provided integrally (e.g., substantially non-removable) with servers or client computing devices, or (ii) removable storage that is removably connectable to the servers or client computing devices via port (e.g., a USB port, a firewire port, etc.) or drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than a mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record. Additionally, as used in the specification, "a portion" refers to a part of, or the entirety of (i.e., the entire portion), a given item (e.g., data) unless the context clearly dictates otherwise.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," the first item of a set of items may be "item 2" unless otherwise stated.

Enumerated Embodiments

The present techniques will be better understood with reference to the following enumerated clauses:

1. A method comprising determining a set of outcome values for a set of message routes for a prediction layer and selecting a target route based on the set of outcome values.
2. A method comprising training, based on different routing tree states of a routing tree, a prediction layer to predict performance metrics by using the set of performance metrics as training data.
3. A method comprising: generating a routing tree based on a set of route options of the routing tree; determining a set of performance metrics associated with the routing tree by, for a respective route of the routing tree, traversing to a respective leaf node of the routing tree to determine a respective total performance metric of the set of performance metrics associated with the respective route based on weights associated with nodes of the routing tree;
4. A method comprising: generating an adaptive routing tree structure based on a set of route options corresponding with a set of adaptive weight nodes; generating a set of routing tree instances of the adaptive routing tree structure by modifying a set of adaptive weights of the set of adaptive weight nodes within a set of weight boundaries to determine a set of sensitive thresholds; generating a prediction model to predict outcome states by using, as training data, the set of routing tree instances and training weight states associated with the set of routing tree instances; determining a weight state based on obtained node weight data; and determining a target route for a candidate message by providing, to the prediction model, the weight state and an input state associated with the candidate message as inputs or configuration parameters.
5. A method comprising: in connection with receiving instructions to obtain a trained model for generating network routes, generating an adaptive routing tree structure based on a set of route options corresponding with a set of adaptive weight nodes indicated to change in real-time; generating a set of routing tree instances of the adaptive routing tree structure for training operations by (1) retrieving a set of weight boundaries for a set of adaptive weights of the set of adaptive weight nodes and (2) determining, for the set of adaptive weight nodes, a set of sensitive thresholds by perturbing the set of adaptive weights within the set of weight boundaries, the set of sensitive thresholds representing thresholds at which changes in an adaptive weight of the set of adaptive weight nodes causes a change in routes associated with an initial routing state; generating a prediction model to predict outcome states by using, as training data, the set of routing tree instances and training weight states associated with the set of routing tree instances, wherein generating the prediction model comprises: assigning, based on the set of sensitive thresholds, a first state-based category to a first training weight state associated with a first routing tree instance and a second state-based category to a second training weight state associated with a second routing tree instance; and generating a first trained sub-model associated with the first state-based category based on the first routing tree instance and a second trained sub-model associated with the second state-based category based on the second routing tree instance; and in connection with receiving a candidate network message, obtaining real-time node weight data to determine a weight state, and providing, to the prediction model, (1) the weight state and (2) an input state associated with the candidate network message as inputs or configuration parameters to determine a target route for the candidate network message.
6. A method comprising: generating an adaptive routing tree structure based on a set of route options corresponding with a set of adaptive weight nodes; generating a set of routing tree instances of the adaptive routing tree structure by (1) retrieving a set of weight boundaries for a set of adaptive weights of the set of adaptive weight nodes and (2) determining, for the set of adaptive weight nodes, a set of sensitive thresholds by perturbing the set of adaptive weights within the set of weight boundaries; generating a prediction model to predict outcome states by using, as training data, the set of routing tree instances and training weight states associated with the set of routing tree instances; and in connection with receiving a candidate message, determining a weight state based on obtained node weight data and determining a target route for the candidate message by providing, to the prediction model, the weight state and an input state associated with the candidate message as inputs or configuration parameters.
7. A method of any of the embodiments above, further comprising: obtaining a set of messages indicating different metrics; updating the set of weight boundaries to an updated set of weight boundaries based on the set of messages; retraining the prediction model based on the updated set of weight boundaries to generate a retrained prediction model; and updating the prediction model based on the retrained prediction model.
8. A method of any of the embodiments above, further comprising determining the obtained node weight data based on an obtained set of latency metrics.
9. A method of any of the embodiments above, wherein: the set of routing tree instances comprises a first routing tree instance associated with a first training weight state for the set of adaptive weights and a second routing tree instance associated with a second training weight state for the set of adaptive weights; generating the prediction model comprises providing (1) the first training weight state as inputs to the prediction model during a first training iteration and (2) the second training weight state as inputs to the prediction model during a second training iteration.

10. A method of any of the embodiments above, wherein: the set of routing tree instances comprises a first routing tree instance associated with a first training weight state for the set of adaptive weights and a second routing tree instance associated with a second training weight state for the set of adaptive weights; generating the prediction model comprises: assigning a first state-based category to the first training weight state based on the set of sensitive thresholds; generating a first trained model of the prediction model based on the first routing tree instance, wherein the first trained model is associated with the first state-based category; assigning as second state-based category to the second training weight state based on the set of sensitive thresholds; generating a second trained model of the prediction model based on the second routing tree instance, wherein the second trained model is associated with the second state-based category.

11. A method of any of the embodiments above, wherein the weight state is a candidate weight state, and wherein determining a route comprises: assigning the first state-based category to the candidate weight state based on a comparison of the candidate weight state with the set of sensitive thresholds; and selecting a the first trained model in lieu of the second trained model for use as the prediction model based on the assignment of the first state-based category to the candidate weight state.

12. A method of any of the embodiments above, further comprising detecting a result indicating that one or more thresholds of the set of sensitive thresholds triggered based on the obtained node weight data, wherein determining the weight state comprises determining the weight state based on the result.

13. A method of any of the embodiments above, further comprising: receiving an indication from a network oracle indicating that a weight corresponding with a variable node exceeds the set of weight boundaries; and updating the set of weight boundaries based on the indication.

14. A method of any of the embodiments above, wherein generating the prediction model comprises: training the prediction model to predict outcome states by using, as training data, the set of routing tree instances; obtaining a set of indicators of payment reversals; determining updated outcome values by updating initial outcome values of nodes based on associations between the nodes and the set of indicators; retraining the prediction model based on the updated outcome values to generate a retrained prediction model; and updating the prediction model based on the retrained prediction model.

15. A method of any of the embodiments above, wherein determining the target route comprises: obtaining, from a client device, a maximum threshold; determining that a first set of leaf nodes of the adaptive routing tree structure is associated with outcomes that violate the maximum threshold; determining a first result indicating that a first route ends at a first leaf node of the first set of leaf nodes; in response to determining the first result, determining a second result indicating that a second route ends at a second leaf node not within the first set of leaf nodes; and providing the second route as the target route.

16. A method of any of the embodiments above, wherein the prediction model comprises a neural network, and wherein generating the prediction model comprises activating a set of soft decision tree functions of a neural unit of the neural network.

17. A method of any of the embodiments above, wherein the prediction model comprises a neural network, and wherein generating the prediction model comprises using a softmax function based on a vector of a neural unit of the neural network as an input.

18. A method of any of the embodiments above, further comprising: obtaining a set of messages indicating different metrics; updating the set of weight boundaries to an updated set of weight boundaries based on the set of messages; and retraining the prediction model based on the updated set of weight boundaries to generate a retrained prediction model.

19. A method of any of the embodiments above, wherein: the set of routing tree instances comprises a first routing tree instance associated with a first training weight state for the set of adaptive weights and a second routing tree instance associated with a second training weight state for the set of adaptive weights; and generating the prediction model comprises providing (1) the first training weight state as inputs to the prediction model during a first training iteration and (2) the second training weight state as inputs to the prediction model during a second training iteration.

20. A method of any of the embodiments above, wherein: the set of routing tree instances comprises a first routing tree instance associated with a first training weight state for the set of adaptive weights and a second routing tree instance associated with a second training weight state for the set of adaptive weights; generating the prediction model comprises: assigning a first state-based category to the first training weight state based on the set of sensitive thresholds; generating a first trained model based on the first routing tree instance, wherein the first trained model is associated with the first state-based category; assigning as second state-based category to the second training weight state based on the set of sensitive thresholds; generating a second trained model based on the second routing tree instance, wherein the second trained model is associated with the second state-based category.

21. A method of any of the embodiments above, further comprising: receiving an indication from a network oracle indicating that a weight corresponding with a variable node exceeds the set of weight boundaries; and updating the set of weight boundaries based on the indication.

22. A method of any of the embodiments above. wherein generating the prediction model comprises: generating the prediction model to predict outcome states by using, as training data, the set of routing tree instances; obtaining a set of indicators of payment reversals; updating outcome values of nodes based on associations between the nodes and the set of indicators; and retraining the prediction model based on the updated outcome values to generate a retrained prediction model.

23. A method of any of the embodiments above, further comprising: obtaining, from a client device, a maximum threshold; determining that a first set of leaf nodes of the adaptive routing tree structure is associated with outcomes that violate the maximum threshold; determining a first result indicating that a first route ends at a first leaf node of the first set of leaf nodes; in response to determining the first result, determining a second result indicating that a second route ends at a second leaf node not within the first set of leaf nodes; and providing the second route as the target route for the adaptive routing tree structure.

24. A tangible, non-transitory, machine-readable medium storing instructions that, when executed by a data processing apparatus, cause the data processing apparatus to perform operations comprising those of any of embodiments 1-23.

25. A system comprising one or more processors; and memory storing instructions that, when executed by the processors, cause the processors to effectuate operations comprising those of any of embodiments 1-23.

26. A system comprising means for performing any of embodiments 1-23.

What is claimed is:

1. A system for efficiently determining a network route through an adaptive weight node network by selecting different dynamic routing protocols based on critical thresholds, comprising one or more non-transitory media storing program instructions that, when executed by one or more processors, causes the one or more processors to perform operations comprising:

in connection with receiving instructions to obtain a trained model for generating network routes, generating an adaptive routing tree structure based on a set of route options corresponding with a set of adaptive weight nodes indicated to change in real-time;

generating a set of routing tree instances of the adaptive routing tree structure for training operations by (1) retrieving a set of weight boundaries for a set of adaptive weights of the set of adaptive weight nodes and (2) determining, for the set of adaptive weight nodes, a set of sensitive thresholds by perturbing the set of adaptive weights within the set of weight boundaries, the set of sensitive thresholds representing thresholds at which changes in an adaptive weight of the set of adaptive weight nodes causes a change in routes associated with an initial routing state;

generating a prediction model to predict outcome states by using, as training data, the set of routing tree instances and training weight states associated with the set of routing tree instances, wherein generating the prediction model comprises:

assigning, based on the set of sensitive thresholds, a first state-based category to a first training weight state associated with a first routing tree instance and a second state-based category to a second training weight state associated with a second routing tree instance; and generating a first trained sub-model associated with the first state-based category based on the first routing tree instance and a second trained sub-model associated with the second state-based category based on the second routing tree instance; and in connection with receiving a candidate network message, obtaining real-time node weight data to determine a weight state, and providing, to the prediction model, (1) the weight state and (2) an input state associated with the candidate network message as inputs or configuration parameters to determine a target route for the candidate network message.

2. A method for efficiently determining a network route by selecting different dynamic routing protocols, comprising:

generating an adaptive routing tree structure based on a set of route options corresponding with a set of adaptive weight nodes;

generating a set of routing tree instances of the adaptive routing tree structure by (1) retrieving a set of weight boundaries for a set of adaptive weights of the set of adaptive weight nodes and (2) determining, for the set of adaptive weight nodes, a set of sensitive thresholds by perturbing the set of adaptive weights within the set of weight boundaries;

generating a prediction model to predict outcome states by using, as training data, the set of routing tree instances and training weight states associated with the set of routing tree instances; and in connection with receiving a candidate message, determining a weight state based on obtained node weight data and determining a target route for the candidate message by providing, to the prediction model, the weight state and an input state associated with the candidate message as inputs or configuration parameters.

3. The method of claim 2, further comprising:

obtaining a set of messages indicating different metrics;

updating the set of weight boundaries to an updated set of weight boundaries based on the set of messages;

retraining the prediction model based on the updated set of weight boundaries to generate a retrained prediction model; and updating the prediction model based on the retrained prediction model.

4. The method of claim 2, further comprising determining the obtained node weight data based on an obtained set of latency metrics.

5. The method of claim 2, wherein:

the set of routing tree instances comprises a first routing tree instance associated with a first training weight state for the set of adaptive weights and a second routing tree instance associated with a second training weight state for the set of adaptive weights; and generating the prediction model comprises providing (1) the first training weight state as inputs to the prediction model during a first training iteration and (2) the second training weight state as inputs to the prediction model during a second training iteration.

6. The method of claim 2, wherein:

the set of routing tree instances comprises a first routing tree instance associated with a first training weight state for the set of adaptive weights and a second routing tree instance associated with a second training weight state for the set of adaptive weights;

generating the prediction model comprises:

assigning a first state-based category to the first training weight state based on the set of sensitive thresholds;

generating a first trained model of the prediction model based on the first routing tree instance, wherein the first trained model is associated with the first state-based category;

assigning as second state-based category to the second training weight state based on the set of sensitive thresholds; and generating a second trained model of the prediction model based on the second routing tree instance, wherein the second trained model is associated with the second state-based category.

7. The method of claim 6, wherein the weight state is a candidate weight state, and wherein determining a route comprises:

assigning the first state-based category to the candidate weight state based on a comparison of the candidate weight state with the set of sensitive thresholds; and selecting a the first trained model in lieu of the second trained model for use as the prediction model based on the assignment of the first state-based category to the candidate weight state.

8. The method of claim 6, further comprising detecting a result indicating that one or more thresholds of the set of sensitive thresholds triggered based on the obtained node weight data, wherein determining the weight state comprises determining the weight state based on the result.

9. The method of claim 2, further comprising:

receiving an indication from a network oracle indicating that a weight corresponding with a variable node exceeds the set of weight boundaries; and updating the set of weight boundaries based on the indication.

10. The method of claim 2, wherein generating the prediction model comprises:

training the prediction model to predict outcome states by using, as training data, the set of routing tree instances;

obtaining a set of indicators of payment reversals;

determining updated outcome values by updating initial outcome values of nodes based on associations between the nodes and the set of indicators;

retraining the prediction model based on the updated outcome values to generate a retrained prediction model; and updating the prediction model based on the retrained prediction model.

11. The method of claim 2, wherein determining the target route comprises:

obtaining, from a client device, a maximum threshold;

determining that a first set of leaf nodes of the adaptive routing tree structure is associated with outcomes that violate the maximum threshold;

determining a first result indicating that a first route ends at a first leaf node of the first set of leaf nodes;

in response to determining the first result, determining a second result indicating that a second route ends at a second leaf node not within the first set of leaf nodes; and providing the second route as the target route.

12. One or more non-transitory machine-readable media storing program instructions that, when executed by one or more processors, causes the one or more processors to perform operations comprising:

generating an adaptive routing tree structure based on a set of route options corresponding with a set of adaptive weight nodes;

generating a set of routing tree instances of the adaptive routing tree structure by modifying a set of adaptive weights of the set of adaptive weight nodes within a set of weight boundaries to determine a set of sensitive thresholds;

generating a prediction model to predict outcome states by using, as training data, the set of routing tree instances and training weight states associated with the set of routing tree instances;

determining a weight state based on obtained node weight data; and determining a target route for a candidate message by providing, to the prediction model, the weight state and an input state associated with the candidate message as inputs or configuration parameters.

13. The one or more non-transitory machine-readable media of claim 12, wherein the prediction model comprises a neural network, and wherein generating the prediction model comprises activating a set of soft decision tree functions of a neural unit of the neural network.

14. The one or more non-transitory machine-readable media of claim 12, wherein the prediction model comprises a neural network, and wherein generating the prediction model comprises using a SoftMax function based on a vector of a neural unit of the neural network as an input.

15. The one or more non-transitory machine-readable media of claim 12, the operations further comprising:

obtaining a set of messages indicating different metrics;

updating the set of weight boundaries to an updated set of weight boundaries based on the set of messages; and retraining the prediction model based on the updated set of weight boundaries to generate a retrained prediction model.

16. The one or more non-transitory machine-readable media of claim 12, wherein:

the set of routing tree instances comprises a first routing tree instance associated with a first training weight state for the set of adaptive weights and a second routing tree instance associated with a second training weight state for the set of adaptive weights; and generating the prediction model comprises providing (1) the first training weight state as inputs to the prediction model during a first training iteration and (2) the second training weight state as inputs to the prediction model during a second training iteration.

17. The one or more non-transitory machine-readable media of claim 12, wherein:

the set of routing tree instances comprises a first routing tree instance associated with a first training weight state for the set of adaptive weights and a second routing tree instance associated with a second training weight state for the set of adaptive weights;

generating the prediction model comprises:

assigning a first state-based category to the first training weight state based on the set of sensitive thresholds;

generating a first trained model based on the first routing tree instance, wherein the first trained model is associated with the first state-based category;

assigning as second state-based category to the second training weight state based on the set of sensitive thresholds; and generating a second trained model based on the second routing tree instance, wherein the second trained model is associated with the second state-based category.

18. The one or more non-transitory machine-readable media of claim 12, the operations further comprising:

receiving an indication from a network oracle indicating that a weight corresponding with a variable node exceeds the set of weight boundaries; and updating the set of weight boundaries based on the indication.

19. The one or more non-transitory machine-readable media of claim 12, wherein generating the prediction model comprises:

generating the prediction model to predict outcome states by using, as training data, the set of routing tree instances;

obtaining a set of indicators of payment reversals;

updating outcome values of nodes based on associations between the nodes and the set of indicators; and retraining the prediction model based on the updated outcome values to generate a retrained prediction model.

20. The one or more non-transitory machine-readable media of claim 12, the operations further comprising:

obtaining, from a client device, a maximum threshold;

determining that a first set of leaf nodes of the adaptive routing tree structure is associated with outcomes that violate the maximum threshold;

determining a first result indicating that a first route ends at a first leaf node of the first set of leaf nodes;

in response to determining the first result, determining a second result indicating that a second route ends at a second leaf node not within the first set of leaf nodes; and providing the second route as the target route for the adaptive routing tree structure.

* * * * *